Sept. 27, 1960 J. O. SPANGLER 2,954,429

TELEVISION INFORMATION DEVICE

Filed April 20, 1956 3 Sheets-Sheet 1

INVENTOR.
JAMES O. SPANGLER
BY
McMorrow, Berman + Davidson
ATTORNEYS

INVENTOR.
JAMES O. SPANGLER
BY
McMorrow, Berman & Davidson
ATTORNEYS

Sept. 27, 1960 J. O. SPANGLER 2,954,429

TELEVISION INFORMATION DEVICE

Filed April 20, 1956 3 Sheets-Sheet 3

INVENTOR.
JAMES O. SPANGLER
BY
McMorrow, Berman + Davidson
ATTORNEYS

United States Patent Office 2,954,429

Patented Sept. 27, 1960

2,954,429

TELEVISION INFORMATION DEVICE

James O. Spangler, Muskogee, Okla.
(Box 272, Heavener, Okla.)

Filed Apr. 20, 1956, Ser. No. 579,650

2 Claims. (Cl. 178—7.5)

This invention relates to television systems, and more particularly to a television system of the type wherein a transmitter furnishes a signal comprising a main television image and an auxiliary information strip superposed at a margin of said image, the system including receivers having viewing screens on which the main image and the auxiliary information strip appear and being provided with means controllable by the viewer for varying the visibility of the information strip as desired by the viewer.

A main object of the invention is to provide a novel and improved television system wherein a main television image is transmitted and an auxiliary information strip is superposed at a margin of the main television image, the system being provided with receivers having viewing screens and having means for varying the visibility of the auxiliary information strip in accordance with the desires of the viewers, the system involving relatively simple components, being reliable in operation, and greatly increasing the utility of the signals transmitted to the receivers by providing valuable information to the viewers in addition to the main pictorial material normally transmitted.

A further object of the invention is to provide an improved television system of the type wherein a main television image and an auxiliary information strip superposed on said image are transmitted, the system having receivers adapted to receive the transmitted material, said receivers being provided with light modifying means controlling the visibility of the auxiliary information strip provided at the margin of the main television image, whereby a viewer may elect either to view the main television image with substantially no intrusion thereon by the auxiliary information strip, or alternatively may cause the information strip to have relatively substantial visibility so that the information strip and main television image are viewed simultaneously.

A still further object of the invention is to provide a television receiver adapted to receive a television signal comprising a main image and an auxiliary information image strip superposed on a marginal portion of the main image, the receiver involving relatively simple components additional to those normally included in a conventional television receiver, the additional components being easy to install, being simple to operate, and being relatively inconspicuous in appearance.

A still further object of the invention is to provide an improved television receiver adapted to receive television signals comprising a main image and an auxiliary information strip superposed on a marginal portion of the main image, the receiver thus enabling a viewer to simultaneously observe the main television image and the auxiliary information strip, whereby valuable auxiliary information, such as special announcements, program information, weather information, and similar valuable auxiliary material may be furnished to the viewer along with the main program, at the option of the viewer.

Further objects and advantages of the invention will become apparent from the following description and claims, and from the accompanying drawings, wherein:

Figure 1:
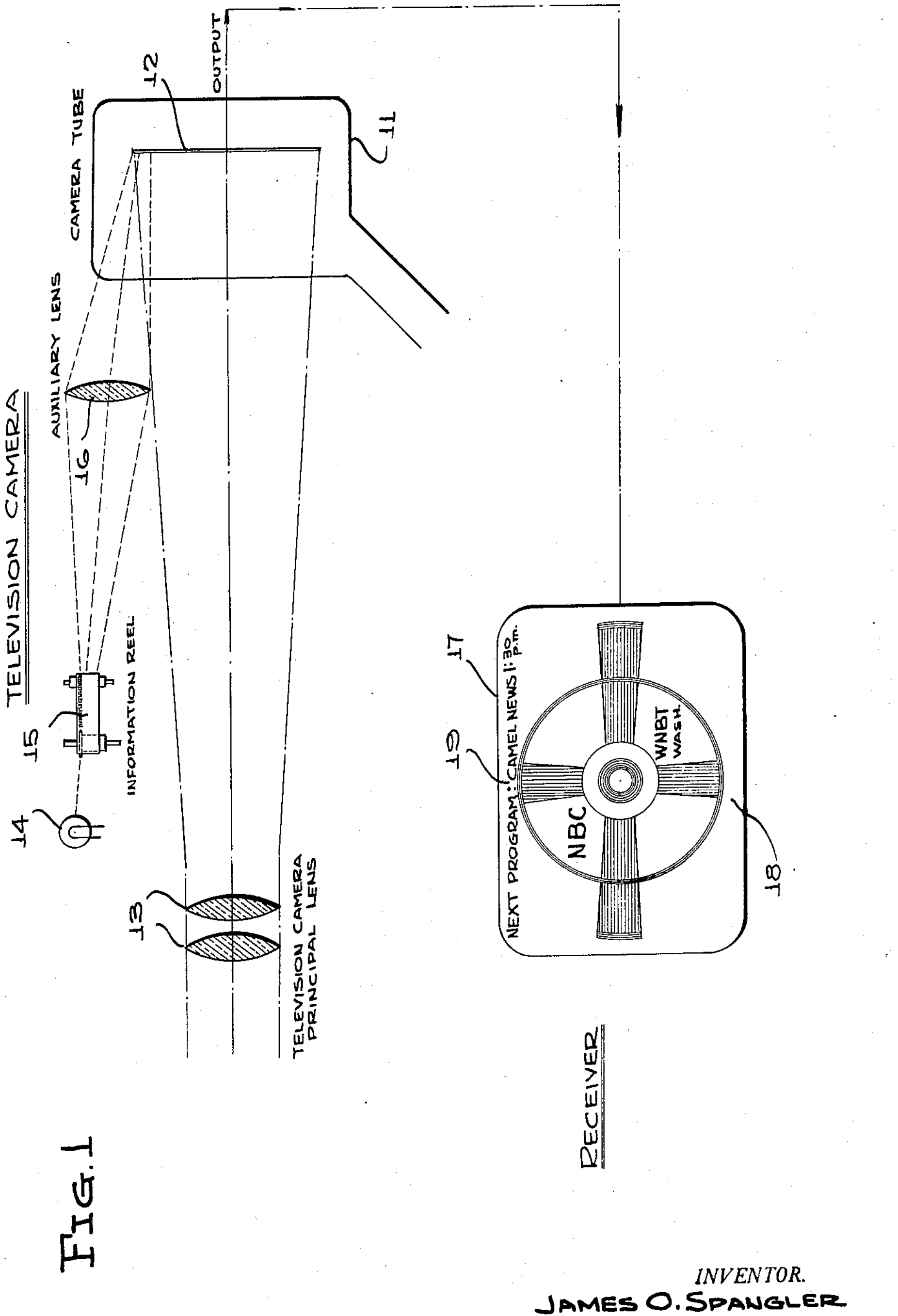
Figure 1 is a diagrammatic view illustrating the manner in which an auxiliary information strip may be superposed on the marginal portion of a main television image at the television camera in a system according to the present invention, and the resultant image appearing on a television receiver screen in the system.

Referring to the drawings, Figure 1 diagrammatically illustrates the elements of a television system according to the present invention, comprising a television camera 11 having a photo-sensitive screen 12 which is scanned in the usual manner, well known in the art, and which receives picture information from a main optical system including, for example, the focusing lenses 13, 13. Auxiliary information, such as program information, news reports, special announcements, weather information, or the like, is superimposed on the top marginal portion of the main information supplied to the photo-sensitive screen element 12 of the camera by an auxiliary optical system including a light source 14, a film strip 15, carrying the auxiliary information, and which is supported on suitable sprockets so that it may be moved in front of the beam of light provided by the light source 14, and the focusing lens 16 through which the illuminated image of the film strip 15 is projected onto the upper marginal portion of the camera photo-sensitive screen 12. The projection system including the information reel 15 may comprise any suitable system adapted to project a strip of picture information onto the upper marginal portion, or any other selected margin of the camera screen 12. The upper marginal portion of the camera screen 12 is preferred, since this provides a strip of information at the top of the viewing screen of the receiver, where it is most easily read, and where its visibility is most easily controlled by the viewer, as will be presently described.

Designated at 17 in Figure 1 is the viewing screen of a television receiver forming part of the television system, the image from the camera 11 being transmitted to the receiver in a well known manner, providing a main television image 18 and an auxiliary image strip 19 superimposed on the top marginal portion of the main television image 18, as is clearly shown in Figure 1.

Referring now to Figures 2, 3 and 4, 20 designates a substantially conventional television receiver having a viewing screen 21 and being housed in a generally rectangular cabinet 22 having the flat top wall 23, the side walls 24, 24, the control panel 25, and the transparent front panel 26 located forwardly adjacent to the viewing screen 27 of the television picture tube 28.

Figures 2, 3, 4, 5, 6, 7:
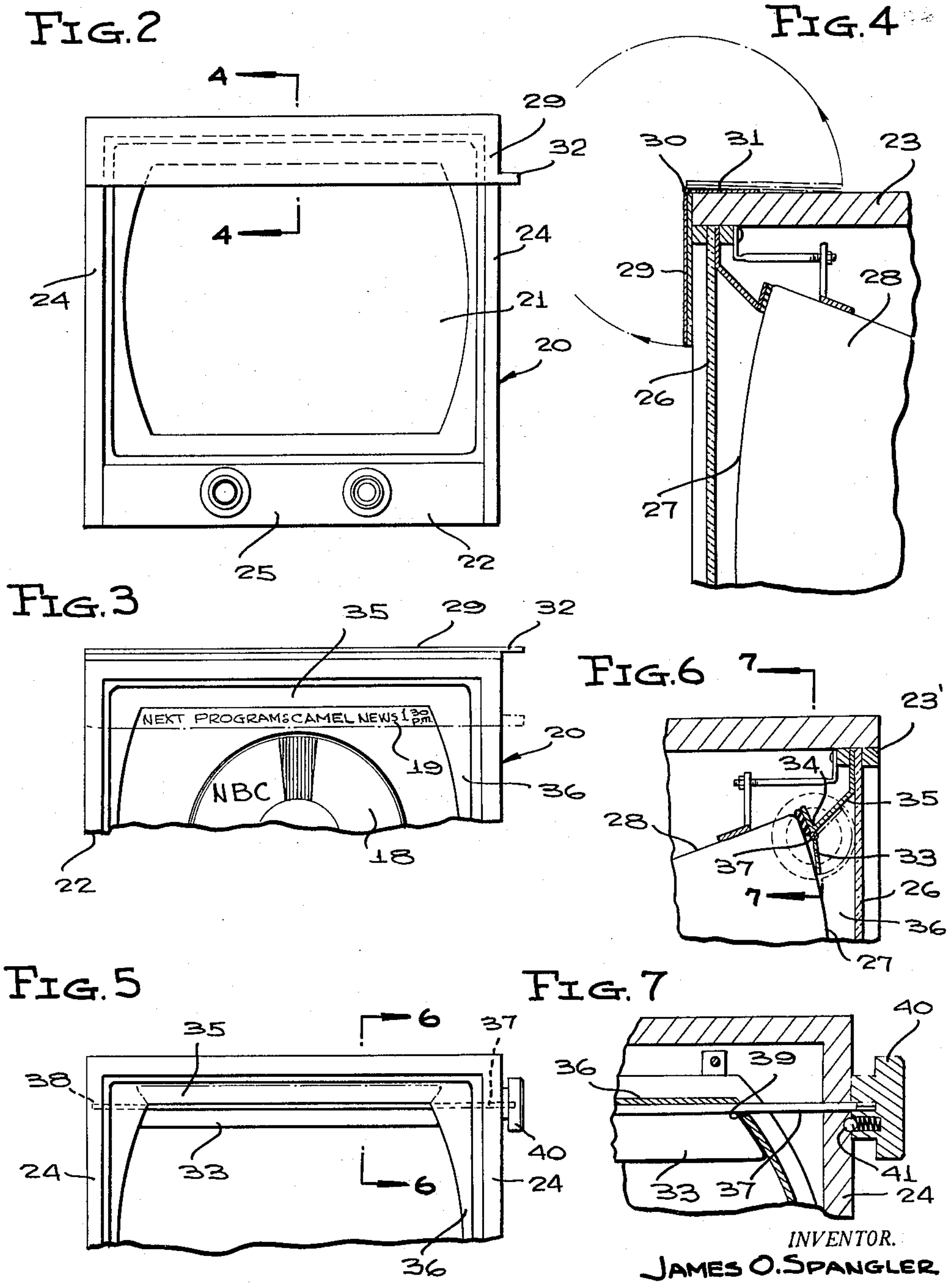
Figure 2 is a front elevational view of a television receiver provided with a manually operated visibility-modifying attachment according to the present invention, enabling a viewer to alter the visibility of the auxiliary information strip at the margin of the viewing screen of the receiver, if so desired.
Figure 3 is a fragmentary front elevational view of the upper portion of the television receiver of Figure 2, showing the visibility-modifying device in elevated position, rotated away from the receiver viewing screen, so as to provide maximum visibility of the auxiliary information strip at the marginal portion of the viewing screen.
Figure 4 is an enlarged vertical cross sectional view taken on line 4—4 of Figure 2.
Figure 5 is a fragmentary front elevational view, showing the upper portion of a modified form of television receiver which may be employed in a television system according to the present invention.
Figure 6 is an enlarged vertical cross sectional view taken on line 6—6 of Figure 5.
Figure 7 is an enlarged vertical cross sectional detail view taken on line 7—7 of Figure 6.

Designated at 29 is a visibility-modifying member which is hingedly connected at 30 to a bracket plate 31 secured to the forward marginal portion of the top wall 23 of the cabinet 22, so that the hinge 30 is located substantially at the horizontal forward top corner of the cabinet and so that the visibility-modifying member 29 may be adjusted to a vertical depending position substantially parallel to the transparent panel 26, and substantially parallel to the viewing screen 27 of picture tube 28, as shown in Figure 4. The visibility-modifying member 29 is of sufficient transverse width to substantially overlie the auxiliary information strip 19 presented on the viewing screen 27 when the member 29 is in the depending vertical position shown in Figures 2 and 4.

The visibility-modifying member 29 is provided at one side edge thereof with a laterally extending finger tab 32 which may be utilized to manually control the position of the visibility-modifying member 29, namely, to swing said member to and from the active position thereof, as shown in Figure 4. Thus, when it is desired to move the visibility-modifying member 29 to an inactive position, the finger tabs 32 may be utilized to rotate said member clockwise, as viewed in Figure 4, to a substantially horizontal position overlying and resting on the top wall 23 of the television cabinet.

The member 29 may be either of opaque material, so as to completely obscure the top marginal portion of the viewing screen 27, or alternatively, may be of suitable tinted, semi-transparent material, such as tinted transparent plastic material, so as to reduce the visibility of the information strip 19 so that said information strip is substantially unnoticeable and therefore does not distract attention from the main television image 18 on the viewing screen.

As will be readily apparent, when the viewer desires to observe the auxiliary information strip, so as to obtain information regarding future programs, weather data, news announcements, or the like, he merely lifts the vision-modifying member 29 from the position shown in Figures 2 and 4 to the inactive position thereof, shown in Figure 3, utilizing the finger tab 32 to rotate the visibility-modifying member 29, as above described.

It will be further noted, that the device shown in Figures 2, 3 and 4 may be readily installed on a conventional television receiver, since it is merely necessary to fasten the bracket plate 31 to the forward marginal portion of the top wall 23 of the existing television cabinet, in the manner shown in Figure 4, thus completing the installation of the vision-modifying device controlling the visibility of the auxiliary information strip provided at the top marginal portion of the viewing screen 27.

Referring now to the modification of the receiver illustrated in Figures 5, 6 and 7, the visibility-modifying member, shown at 33 is installed within the television receiver cabinet, shown at 23', as a permanent part of the receiver installation. Thus, the movable visibility-modifying member 33 is hinged at 34 to the lower marginal edge of the top segment 35 of the picture tube viewing mask 36. Therefore, in this form of the invention, the visibility-modifying member may be manufactured as a portion of the viewing mask to be employed in conjunction with a picture tube 28, no other modification of the receiver cabinet 23' being required, with the exception of an opening in the top portion of one of the side walls 24 of the cabinet, through which extends the hinge shaft 37, as shown in Figure 7, and the provision of a bearing recess in the upper portion of the opposite side wall 24 to rotatably receive an end 38 of the hinge shaft 37, as shown in Figure 5. As shown in Figure 7, the hinge shaft 37 extends rotatably through bearing openings 39 provided in the upper corner portions of the picture tube mask 35 so that the shaft 37 is supported at the upper corner portions of the picture tube mask, as well as in the opposite side walls 24, 24 of the receiver cabinet. Secured to the outer end of the hinge shaft 37 is a control knob 40, said control knob being provided with a spring pressed ball detent 41 which yieldably engages with suitable recesses provided in the adjacent surface of the cabinet side wall 24 to lock the knob in either of at least two positions, one of which locates the visibility-modifying element 33 in overlying relationship to the upper marginal portion of the picture tube viewing screen 27, as shown in Figure 6, and the other of which locates the member 33 in a second position rotated outwardly a substantial angle around the axis defined by hinge shaft 37 from the first position, for example, against the top segment 35 of the screen mask 36, as shown in dotted view in Figure 6. Since the ball detent 41 is relatively yieldable, the visibility-modifying element 33 may be manually rotated to either the active position thereof, shown in Figure 6, to substantially obscure the information strip 19 at the top marginal portion of the television viewing screen 27, or may be rotated to an inactive position, as shown in dotted view in Figure 6, whereby maximum visibility of the top marginal information strip of the television viewing screen is obtained.

As in the previously described form of the invention, the visibility-modifying member 33 may comprise either opaque material, or suitably tinted, semi-transparent material having sufficient opacity with respect to the auxiliary information strip to subdue the effect of said strip so as to render the strip substantially unnoticeable and so as to prevent said strip from distracting the attention of the viewer from the main television picture.

Figure 8:
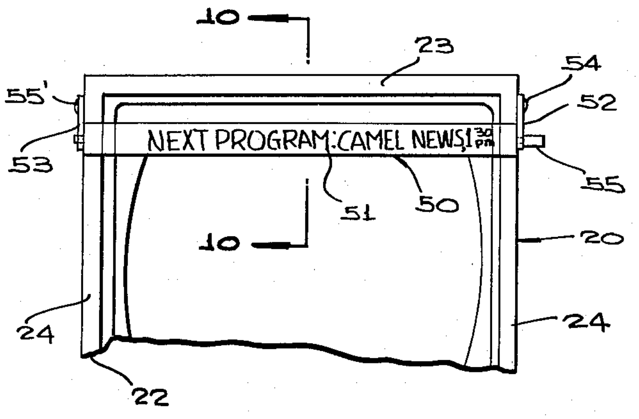
Figure 8 is a front elevational view of the upper portion of a further modified form of television receiver forming part of a television system according to the present invention, showing the visibility-modifying member of the receiver in active position, providing maximum visibility of the auxiliary information strip at the margin of the viewing screen of the receiver.
Figures 9, 10:
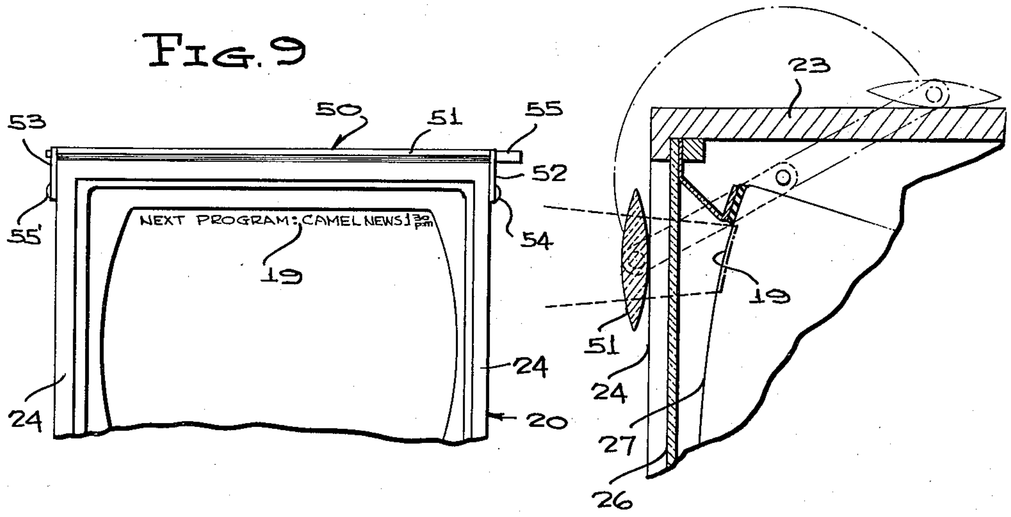
Figure 9 is an elevational view, similar to Figure 8, but showing the visibility-modifying member of the receiver in an inactive position, whereby the auxiliary information strip at the margin of the viewing screen of the receiver has minimum visibility.
Figure 10 is an enlarged transverse vertical cross sectional view taken on line 10—10 of Figure 8.

Referring now to the form of the receiver shown in Figures 8, 9 and 10, a conventional television receiver 20 is provided with a visibility-modifying attachment, designated generally at 50, in accordance with the present invention, for controlling the visibility of the auxiliary information strip at the top marginal portion of the television viewing screen 27.

In this case, the visibility-modifying element comprises a cylindrical lens 51 which is supported at its opposite ends on respective arms 52 and 53 pivotally secured at 54 and 55' to the upper portions of the side walls 24, 24 of the television cabinet 22, the arms 52, 53 being likewise pivotally connected to the ends of the cylindrical lens 51 so that said lens may freely rotate with respect to the arms 52 and 53. Thus, the arms 52 and 53 are of sufficient length so that the lens 51 may be positioned against the front edges of the cabinet side walls 24, 24, in the manner shown in Figure 10, causing the lens to assume a vertical position located directly in front of the top marginal portion of the television viewing screen 27, whereby the auxiliary information strip 19 will be greatly magnified with respect to persons observing the viewing screen 27 from the front thereof. The arm 52 is provided adjacent its pivotal connection to the end of lens 51 with a control handle 55, enabling the lens to be swung clockwise, as viewed in Figure 10, from the active position thereof to an inactive position, shown in dotted view in Figure 10, wherein the lens 51 engages with the top surface of the cabinet top wall 23 and lies flat against said top wall.

As illustrated in Figure 9, the information strip normally is of relatively small vertical magnitude, whereby the strip is normally substantially unnoticeable to the viewer and hence does not distract the viewer's attention from the main television picture appearing on the viewing screen 27. To increase the visibility of the auxiliary information strip 19, the viewer merely rotates the lens 51 from the dotted view position thereof shown in Figure 10 in a counterclockwise direction, utilizing the control handle 55, to bring the lens into its active position, wherein it is disposed vertically and in front of the upper marginal portion of the viewing screen 27, as shown in full line view in Figure 10, whereby the information strip 19 appears in greatly magnified form, as shown in Figure 8, with maximum visibility.

As in the case of the attachment shown in Figures 2, 3 and 4, the visibility-modifying attachment of Figures 8, 9 and 10, may be readily installed on an existing conventional television receiver cabinet, since it is merely necessary to pivotally fasten the ends of the link arms 52 and 53 to the upper portions of the side walls 24, 24 of the cabinet, as shown at 54 and 55.

It will be readily apparent that the system above described is applicable in conjunction with either television broadcasting of the monochrome type, such as black and white television broadcasting or of the color type. Thus, the visibility-modifying devices described above may be employed not only on conventional black and white television receivers but also on color television receivers, and may be operated in the same manner as described above and as illustrated in Figures 2 to 10.

In applying the magnifying lens arrangement of Figures 8, 9 and 10 to color television receivers, the lens is preferably tinted in a shade or color suitable for obtaining the maximum desired result, such as blending the lens to the chosen broadcasted information print color to obtain maximum visibility of the information when the lens is in information-viewing position.

While certain specific embodiments of a television system including means for transmitting a main television image and an auxiliary information strip superposed at a margin of said main image have been disclosed in the foregoing description, it will be understood that various modifications within the spirit of the invention will occur to those skilled in the art. Therefore it is intended that no limitations be placed on the invention except as defined by the scope of the appended claims.

What is claimed is:

1. In combination, a television receiver having a viewing screen, a cabinet surrounding said receiver and having a substantially flat top wall, vertical side walls and a transparent front panel located forwardly adjacent said viewing screen, respective arms pivotally secured to the upper portions of said side walls adjacent said transparent front panel, and a horizontal elongated cylindrical lens pivotally secured at its ends to the respective arms and being freely rotatable with respect thereto around a horizontal axis, said arms being of sufficient length to at times support said lens vertically in front of the top marginal portion of the viewing screen and to at other times allow said lens to be swung upwardly and rearwardly to a substantially horizontal position lying flat against said top wall.

2. In combination, a television receiver having a viewing screen, a cabinet surrounding said receiver and having a substantially flat top wall, vertical side walls and a transparent front panel located forwardly adjacent said viewing screen, respective arms pivotally secured to the upper portions of said side walls adjacent said transparent front panel, a horizontally elongated cylindrical lens pivotally secured at its ends to the respective arms and being freely rotatable with respect thereto around a horizontal axis, said arms being of sufficient length to at times support said lens vertically in front of the top marginal portion of the viewing screen and to at other times allow said lens to be swung upwardly and rearwardly to a substantially horizontal position lying flat against said top wall, and a control handle on one of the arms adjacent its pivotal connection to said lens.

References Cited in the file of this patent

UNITED STATES PATENTS

| | | |
|---|---|---|
| 1,957,716 | Koster | May 8, 1934 |
| 2,586,723 | Sakols | Feb. 19, 1952 |
| 2,706,139 | Jabczenski | Apr. 12, 1955 |
| 2,721,956 | Houghton | Oct. 25, 1955 |
| 2,725,788 | Pfleger | Dec. 6, 1955 |
| 2,751,583 | Jones | June 19, 1956 |
| 2,759,178 | Rose | Aug. 14, 1956 |
| 2,854,505 | Davis | Sept. 30, 1958 |